UNITED STATES PATENT OFFICE.

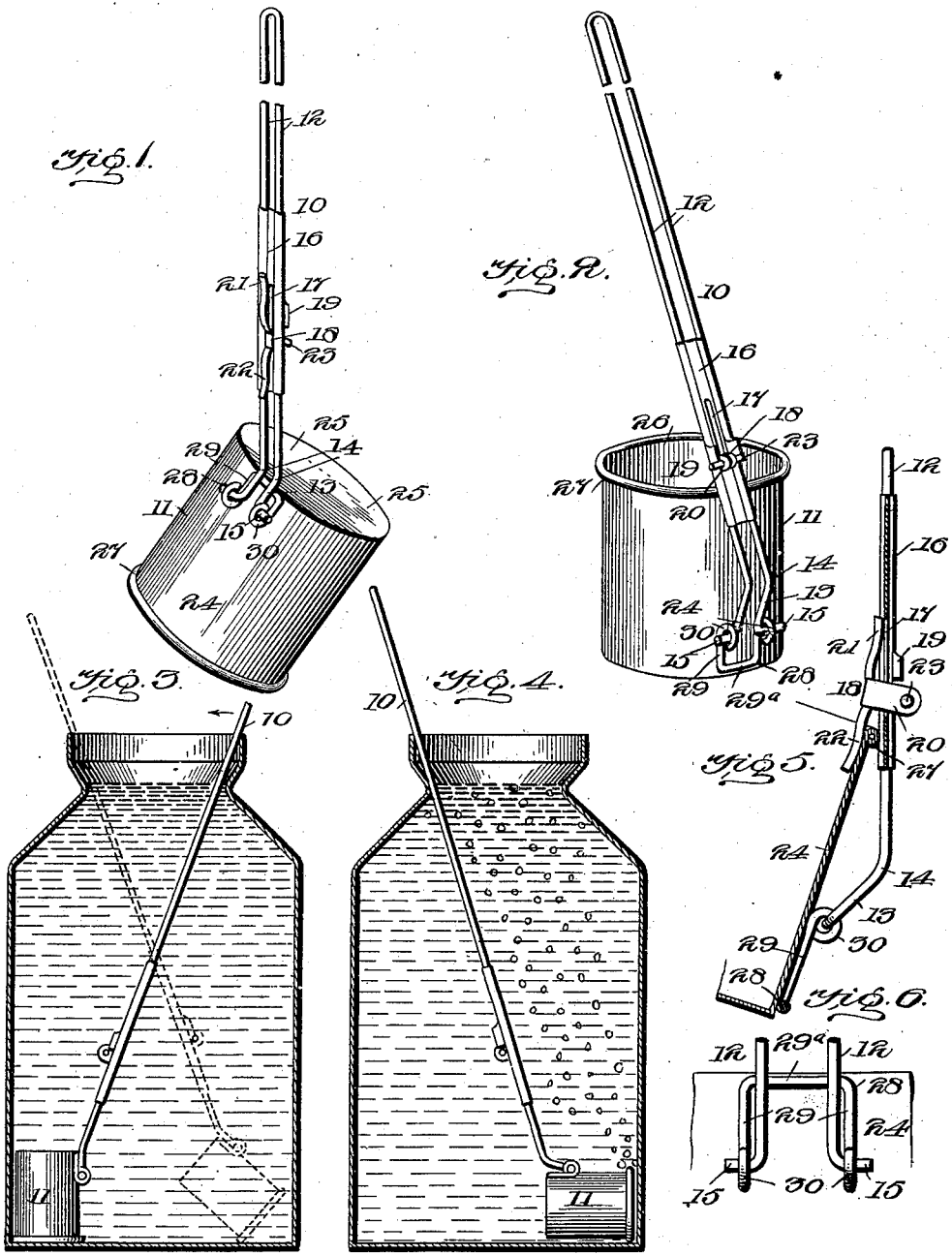

DAVID DANIEL KIMBERLIN, OF HUDSON, OHIO.

COMBINED AERATOR AND DIPPER.

SPECIFICATION forming part of Letters Patent No. 687,635, dated November 26, 1901.

Application filed March 8, 1901. Serial No. 50,352. (No model.)

*To all whom it may concern:*

Be it known that I, DAVID DANIEL KIMBERLIN, a citizen of the United States, residing at Hudson, in the county of Summit and State of Ohio, have invented a new and useful Combined Aerator and Dipper, of which the following is a specification.

The present invention relates to a combined milk aerator and dipper, and particularly to that type covered broadly by a previous patent issued to me on August 7, 1900, and numbered 655,245. In said patent a construction is shown and described embodying a handle and a cup pivoted at its upper edge to the handle. This cup is adapted to be arranged with the open end down and plunged to the bottom of a can of milk, after which it is inverted to release the air contained therein which bubbles up through the milk. There are certain objections to this construction. In the first place, because of the cup being pivoted at its upper edge, stops are necessary to prevent the complete inversion of the cup, so that when it is drawn from the milk it will not be filled; but even with these stops it will not readily reassume its proper position to carry the air into the milk after its withdrawal therefrom when it is desired to repeat the operation, and it therefore becomes necessary to hold it, either by hand or against the wall of the can, until its mouth has been forced below the surface. A further objection appears when the device is used as a cup, for the reason that because of the stops milk cannot readily be dipped from a can, and, again, because of the free movement of the cup the contents are very easily spilled. The present invention aims to improve this construction and overcome all of the above objections by providing a device in which the cup will automatically assume its proper position to carry air into the liquid and also by providing means whereby the cup and handle may be locked against relative movement, so that the device may be used as a dipper.

To the accomplishment of these objects the construction shown in the accompanying drawings and described in the following specification is preferred; but it will be understood that this construction may be changed and modified, if desired, provided such change or modification is within the scope of the appended claims.

In the drawings, Figure 1 is a perspective view of the device when used as an aerator.
Fig. 2 is a perspective view of the same when arranged for use as a dipper. Fig. 3 is a view of the aerator in its first position when plunged to the bottom of a can of milk. Fig. 4 is a view similar to Fig. 3, but illustrating the position and relation of the cup after the air has escaped therefrom. Fig. 5 is a detail longitudinal section of a portion of the cup and handle locked against relative movement. Fig. 6 is a detail view of the pivotal connection.

Similar numerals of reference designate corresponding parts in all the figures of the drawings.

Broadly the construction comprises, as in the above-described patent, two members—a handle 10, to one end of which is pivotally connected a cup 11. The handle 10 preferably comprises a pair of spaced parallel arms 12, formed by bending a wire or rod upon itself. These arms are offset at one end, as at 13, to form an abutment 14, and their ends are bent outwardly to form a pair of oppositely-disposed pintles 15. Connecting the arms 12 intermediate their ends is a metallic strip 16, having a slot 17, in which is slidably mounted a latch 18. A pair of lugs 19 are arranged upon the handle contiguous to the lower end of the slot. The latch 18 comprises a shank 20, which passes through the slot 17 and has on one side a pair of oppositely-disposed arms 21 and 22, arranged longitudinally of the handle, the opposite end being provided with a transverse retaining-pin 23, that is adapted to drop below the holding-studs 19 when the latch is in its lowest position.

The cup 11 is preferably constructed in the usual form, having cylindrical side walls 24, a closed bottom 25, and an open top 26, having an outstanding bead 27 about its edge. Arranged upon its side walls and contiguous to the bottom or closed end is the hinge-ear 28. This is preferably in the form of a loop having side arms 29, the free ends of which are bent to provide a pair of spaced hinge-eyes 30. The loop is secured flat upon the wall of the cup with the connecting portion 29ª between the two side arms arranged at the edge of the same. The eyes 30 will thus be located intermediate the ends of the cup, but contiguous to its lower edge. In assembled relation the pintles 15 of the arm are sprung into the eyes 30, whereby the cup and handle are pivotally connected. The cup is thus free to swing completely about the end of the handle, and the connecting portion 29ª of the hinge-ear is arranged to rest against the shoulder or abutment 14 of the handle when the cup is in its inverted position. It will therefore be maintained at an angle to the handle. On the other hand, when the cup is swung against the opposite side of the handle or in its upright position its upper edge is arranged contiguous to the latch 18, and the locking-arm 21 can be slipped over the same.

The manner of operating the device is substantially as follows: In aerating milk the cup is left free to swing, and it will therefore assume an inverted position, because of the pivot being near the bottom or closed end. The handle is then held in upright position against one edge of the mouth of the can, and the cup is plunged to the diagonally opposite portion of the bottom thereof. The cup will be held in its inverted position by the upward pressure of the imprisoned air and at the same time will be practically vertical, as shown in full lines in Fig. 3. The upper end of the handle is then moved to the opposite side of the can-mouth, thus slightly tilting the cup and permitting some of the confined air to escape, after which the upper end of the handle is held against this latter side and the cup is moved across to the opposite side. It will therefore be gradually tilted more and more until it assumes the position shown in dotted lines in Fig. 3, and the air will have been distributed across the entire width of the can. To complete the operation and empty the cup of air, a slight downward pressure is applied to the handle, which will move the cup to a horizontal position, as shown in Fig. 4. Upon raising the cup it will immediately reassume its inverted position, so that when withdrawn from the liquid it will be emptied of the milk and be in proper position to be again inserted. This operation is repeated a sufficient number of times to completely aerate the milk. By experience a period of two minutes has ordinarily proved sufficient. In using the device as a dipper the cup is arranged against the handle with its open end uppermost. The latch is then engaged over the edge, thus holding the cup and handle against relative movement. In this position the retaining-pin 23 will be seated behind the shoulders or studs 19, and thus the latch will be securely held against accidental displacement. It will be observed that when in this position the bead at the upper edge of the cup abuts against the handle, and thus compensates to a certain extent for the offset arrangement of said handle, so that the latter will be disposed nearer to a plane parallel to the side wall of the cup. When in its inverted position, however, the shoulder 14 of the handle will be in contact with the connecting portion of the hinge-ear, so that the handle and cup will be disposed at an angle to each other.

It will thus be seen that the present construction has several important advantages in that when in use as an aerator it will always assume its operative position and will automatically be emptied of the liquid when withdrawn therefrom. Furthermore, it is capable of use as an ordinary dipper which can be used to withdraw milk or other liquid from a can having a narrow mouth.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a device of the class described, the combination with a handle member, of a cup member pivoted to the handle member, and adapted to be arranged with its open end up, and coacting means carried by the handle and cup members to hold the cup member with its open end up, said handle member having a portion located in the path of movement of the cup member to maintain the same open end down while being plunged into a body of liquid.

2. In a device of the class described, the combination with a handle, of a cup pivoted to the end of the handle and having a free swinging movement about the same, said handle being located in the path of movement of the cup so that said cup may be arranged on one side of the handle with its open end up, and on the other side with its open end down, and coacting means carried by the handle and cup to hold said cup with its open end up.

3. In a device of the class described, the combination with a handle, of a cup pivoted to the handle, and a sliding latch carried by the handle, and arranged to engage over the edge of the open end of the cup to hold said cup and handle against relative movement.

4. In a device of the class described, the combination with a handle, of an open-ended cup pivoted intermediate its ends to the end of the handle and having a free swinging movement about the same so that it can assume a position on one side of the handle with its open end up, or can swing to an inverted position upon the opposite side of the handle.

5. In a device of the class described, the combination with a handle, of an open-ended cup pivoted intermediate its ends to the end of the handle and having a free swinging movement about the same so that it can assume a position on one side of the handle with its open end up, or can swing to an inverted position upon the opposite side of the handle, said handle limiting the swinging movement of the cup in both directions.

6. In a device of the class described, the combination with a handle, of an open-ended cup pivoted intermediate its ends to the end of the handle and having a free swinging movement about the same so that it can assume a position on one side of the handle with its open end up, or can swing to an inverted position upon the opposite side of the handle, said handle limiting the swinging movement of the cup in both directions, and means for securing the cup to the handle with its open end up.

7. In a device of the class described, the combination with a cup having a closed end, of a handle having a pivotal connection with the cup at one side of and contiguous to its lower end, said cup having a free swinging movement about the end of the handle so that it can assume a position on one side of the handle with its open end up, and can swing to an inverted position upon the opposite side of the handle, and a latch slidably mounted upon the handle, and arranged to engage over the upper edge of the cup to hold said cup and handle against relative movement.

In testimony that I claim the foregoing as my own I have hereto affixed my signature in the presence of two witnesses.

DAVID DANIEL KIMBERLIN.

Witnesses:
  M. C. READ,
  GEO. P. LENMAN.